US012038941B1

(12) United States Patent
Meedinti Bhaskara Reddy et al.

(10) Patent No.: US 12,038,941 B1
(45) Date of Patent: Jul. 16, 2024

(54) DATA MESH FOR UNSTRUCTURED DATA

(71) Applicant: Bank of America Corporation, Charlotte, NC (US)

(72) Inventors: Harinath Meedinti Bhaskara Reddy, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/143,203

(22) Filed: May 4, 2023

(51) Int. Cl.
*G06F 16/25* (2019.01)
(52) U.S. Cl.
CPC .......... *G06F 16/258* (2019.01); *G06F 16/252* (2019.01)
(58) Field of Classification Search
CPC .............................. G06F 16/258; G06F 16/252
See application file for complete search history.

(56) References Cited

U.S. PATENT DOCUMENTS

| | | | | |
|---|---|---|---|---|
| 2011/0040808 A1* | 2/2011 | Joy | ........................ | G06F 8/20 |
| | | | | 707/E17.014 |
| 2012/0278336 A1* | 11/2012 | Malik | .................... | G06F 40/289 |
| | | | | 707/748 |
| 2016/0180557 A1* | 6/2016 | Yousaf | .................... | G06F 21/50 |
| | | | | 715/762 |
| 2019/0325036 A1* | 10/2019 | Edge | ...................... | G06F 16/248 |
| 2021/0225466 A1* | 7/2021 | Barkan | .................... | G06F 16/35 |
| 2021/0271632 A1* | 9/2021 | Nakajima | ............. | G06F 16/116 |
| 2022/0237934 A1* | 7/2022 | Matcham | ............. | G06F 18/285 |

* cited by examiner

*Primary Examiner* — Robert W Beausoliel, Jr.
*Assistant Examiner* — Mohammad S Bhuyan
(74) *Attorney, Agent, or Firm* — Weiss & Arons LLP

(57) ABSTRACT

An apparatus and method for using a data mesh to structure unstructured data is provided. The apparatus and method involves transmitting an unstructured dataset from a first node to a data mesh, transmitting receiving the unstructured dataset at a data ingestion engine, analyzing data included in the unstructured dataset, splitting the data included in the dataset into a plurality of data fragments, assigning a level of structure to each data fragment aggregating the data fragments to form a plurality of data segments, transmitting each data segment that is assigned a level of structure to a corresponding data silo, storing each data segment in the corresponding data silo, creating a data structure map of where each data segment is stored, receiving a data request at the data ingestion engine from a second node, using the data structure map to locate the plurality of data segments of the dataset, determining if one or more of the data segments has an assigned level of structure that is less than an assigned level of structure of the second node, and restructuring based on the assigned level of structure of data.

16 Claims, 8 Drawing Sheets

DATA MESH FOR UNSTRUCTURED DATA

FIELD OF TECHNOLOGY

Aspects of the disclosure relate to storage. Specifically, aspects of the disclosure relate to structured data storage.

BACKGROUND OF THE DISCLOSURE

A data mesh is a decentralized data architecture used to store data. There is currently a need to provide structure to unstructured data using a decentralized data architecture.

A large network of data or a complex data mesh may include unstructured data at various locations in the network or mesh. Various users may desire to access structured data.

It would be desirable to be able to structure a data storage framework in accordance with both the data's level of structure and the user's desired level of structure.

It would be desirable, therefore, to provide systems and methods for providing access to structured data according to a user's desired level of structure.

SUMMARY

Provided herein are apparatus and methods for structured data storage using a data mesh for structured data processing. The structured data processing may include multi-leveled structure-based data storage in a multi-siloed database. The structured data processing makes it easier and faster for a user to access data and organize it in the future.

It is an object of the invention to structure data such that a user can readily access the data across a network or data mesh in accordance with the user's desired level of structure. It may be advantageous to utilize artificial intelligence and/or machine learning (AI/ML) systems to structure the data such that the accessor can access data according to their desired level of structure.

It is a further object of the invention to remove or reorganize unstructured data. It may be advantageous to utilize AI/ML systems to store, offload, and/or distribute the data according to the degree of structure it has been assigned.

Methods may include receiving unstructured datasets. The unstructured datasets may be stored within a plurality of nodes and silos. The unstructured datasets may be received from a plurality of systems or record. The unstructured datasets may be received at the unstructured data layer within a data exchange.

Methods may include generating a list of dependencies between the plurality of nodes. The list of dependencies may be based on a data structure model. Each node included in a second subset of the plurality of nodes may be dependent on at least one node included in a first subset of the plurality of nodes.

Methods may include processing the first subset of the plurality of nodes. Each of the nodes included in the first subset of the plurality of nodes may be processed concurrently. The processing may include structuring the unstructured data records stored in the first subset of the plurality of nodes. The structuring may be executed at the unstructured data layer. The structuring may form and/or generate structured data.

The structuring may include reformatting the unstructured data from ASCII format to a format consumable by the data apparatus. ASCII stands for American Standard Code for Information Interchange and is a character encoding standard for electronic communication. The structuring may process the data for optical character recognition (OCR) to make the data searchable. A data mesh may be applied over the structured data.

The structured data may be included in the first subset of nodes. The processing may include transmitting the structured data to a transport layer and to a structured data layer. The structured data layer may include a data ingestion engine.

Methods may include processing each node included in the second subset of nodes. Each node, included in the second subset of nodes, may be processed upon completion of processing of the node included in the first subset of nodes from which the node included in the second subset of nodes depends.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
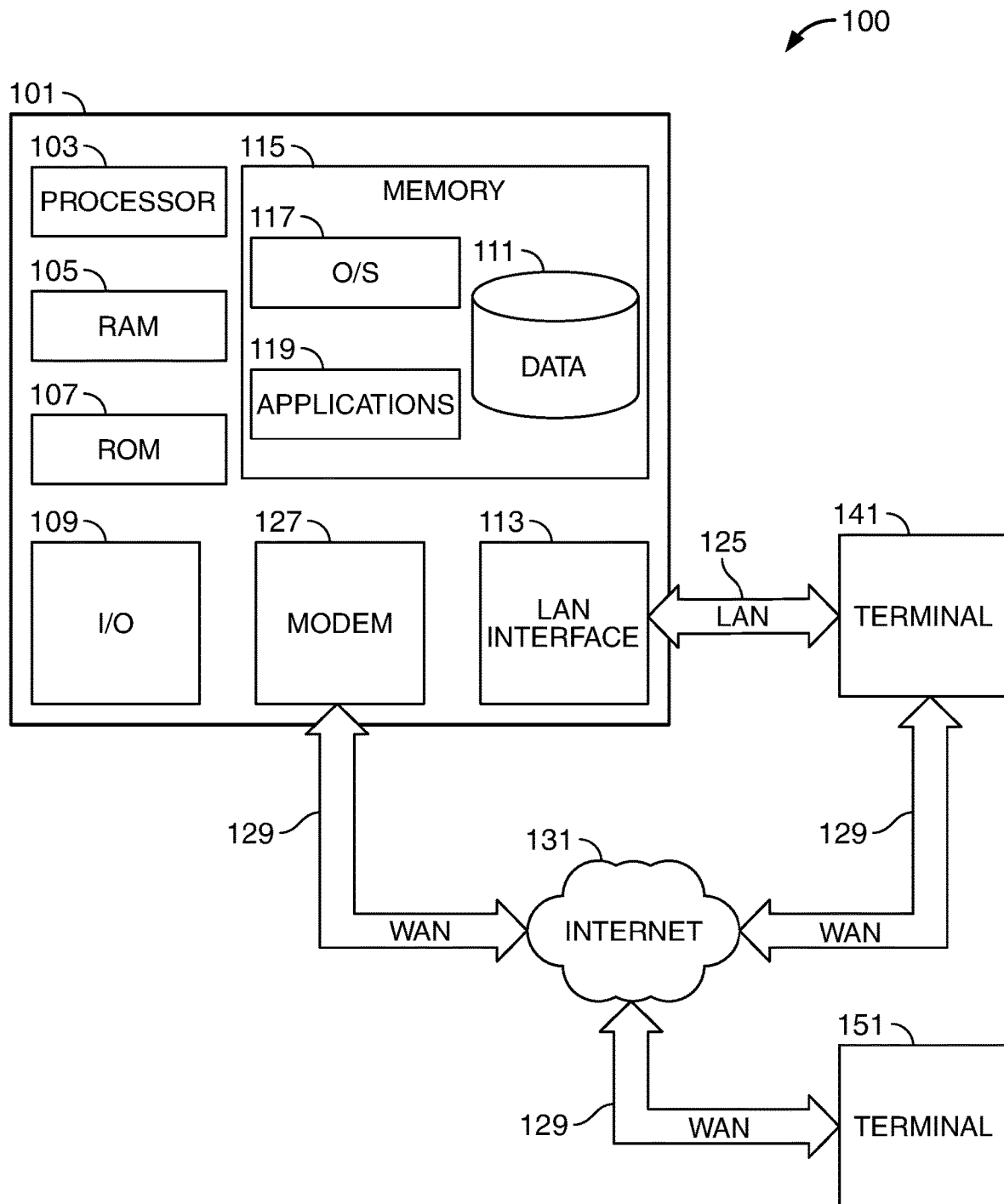
FIG. 1 shows an illustrative block diagram in accordance with principles of the disclosure.

Apparatus and methods are herein provided to meet the above outlined objectives of the invention.

Aspects of the disclosure may relate to apparatus and methods for structuring data using a data mesh. A data mesh may exist within a data exchange. A data exchange may serve as an information hub for an enterprise.

Methods may include structuring data stored in data storage units across a network and/or a data mesh to expedite access to structured data. The method may include operating a data ingestion engine to implement AI/ML systems. The data ingestion engine may communicate with data storage units or silos located in a network. The data ingestion engine may communicate with data storage units or silos located in a data mesh. The data ingestion engine may implement a machine learning system to categorize and layer data within data storage units according to data structure level. The machine learning system may tokenize or encrypt the data in the data storage units by creating a token or key in the metadata of the data that corresponds to the structure of the data. The data ingestion engine may receive a user token or key from a user of a user unit. The data ingestion engine may receive a device token or key from a device of a user device. The data ingestion engine may receive a user token or key and a device token or key from a user device.

Methods may include the data ingestion engine implementing a machine learning system to optimize the former's structuring with a data map or data structure map. The data ingestion engine may look up a data structure map. The data structure map may contain information about a user device's authorization to access varying levels of structured data based on the user token or key. The data structure map may contain information about a user device's desire to access varying levels of structured data based on the device token or key. The data structure map may contain information about a user device's desire to access varying levels of structured data based on the user token or key and the device token or key.

Methods may include the data ingestion engine implementing a machine learning system to optimize the former's structuring of a data storage unit. The data ingestion engine may provide the user token or key. The data ingestion engine may provide the device token or key. The data ingestion engine may provide both the user token or key and the device token or key. The data ingestion engine may present these tokens or keys to a controller positioned between the data ingestion engine and a data storage unit. After receiving the tokens or keys, the controller may communicate with the data storage unit to wake the latter up from a dormant state. The controller may communicate by way of a backchannel to the data storage unit. The data ingestion engine may receive approval from the controller to access the data storage unit. The data ingestion engine may then communicate directly with the data storage unit. The data ingestion engine may communicate with the data storage unit through the controller. The data ingestion engine may provide the user token or key, the device token or key, or both the user token or key and device token or key directly to the data storage unit. The data ingestion engine may then retrieve data according to the level of data structure. The level of structure may be a function of rules given in the data structure map. The level of structure may be a function of which data is accessible with the user token or key and the device token or key, or both the user and device tokens or keys. The data ingestion engine may provide the retrieved data to the user device.

The data ingestion engine may additionally instruct the data storage units to revert to an unstructured state. In the unstructured state, data in the data storage units may be inaccessible to users who desire a higher data structure level.

The data ingestion engine may implement AI/ML techniques to learn how to structure data based on previous structuring, thus creating a feedback loop of training data provided.

Data may be retrieved from various systems of record (SORs) and placed into the data mesh. The retrieved data may include data from legacy systems, pre-existing enterprise applications and channels. The retrieved data may include service-related information. The service-related information may be retrieved from various systems across the enterprise that service consumers/developers.

The data may be retrieved from different application systems located in different physical and/or virtual locations. Such application systems may include external systems, such as an integrated technology and/or data and analytics platform that systems use to navigate a project or process lifecycle. Such application systems may include databases, mainframes and file systems, such as structured query language (SQL) server or Oracle. Data may also be received from real-time or event subscriptions. Data may also be received from loan modification systems or workflow systems related to loan modification. Data may also be retrieved from one or more servicing platforms. It should be appreciated that the data may be hosted at internal systems and/or external systems. But the ownership of the data is with the SOR—the provider of data.

The data retrieved may be placed into the data mesh. The data mesh may include one or more databases.

The data is typically retrieved during non-business hours, such as night hours. The data is typically retrieved in a batch mode, with multiple data elements being retrieved at substantially the same time, preferably in a single batch. The retrieval may be executed for different systems at different time intervals. The retrieved data is placed in the unstructured data section within the database. The data may also be ingested in real time continuously via event stream or Representational State Transfer (REST) or Simple Object Access Protocol (SOAP) application programming interfaces (APIs).

There may be a structuring process that is executed on the unstructured data in order to structure the data. The structuring process structures the data to avoid data redundancy and to decrease entropy. Entropy, in the context of this application, may be understood as disorganization or randomness within a plurality of data elements.

Structured data may be included in the structured data layer or the transport layer. The structured data is provisioned out from the transport layer to consumers. Each of the consumers may be associated with a different application interface technology. Each of the consumers may be able to retrieve all the structured data it needs from one location as opposed to going to, for example, 50-100 SORs to retrieve the data. Additionally, the structured data retrieved by each of the consumers may be non-redundant and have decreased entropy.

It should be appreciated that the system may be a physical database. The system physically pulls the data, physically runs the structuring process to structure the data and then physically provisions the structured data. As such, the system is not only a virtual system. It is a physical system as well.

The value provided by the system includes co-location of data, integration of different data files from various SORs into one data structure model and elimination of platform discrepancies and differences. In embodiments where the system is retrieving vendor data, the system may be a proxy to retrieve data stored on vendor environments.

Apparatus may include a system for structuring data stored in data storage units across a network and/or a data mesh in a manner that may speed up and optimize access to structured data.

The system may include a network. The system may include a data ingestion engine operating in the network. The system may include data storage units located in the network in electronic communication with the data ingestion engine. The system may include controllers located in the network in electronic communication with the data ingestion engine and the data storage units. The controller may also be called a gatekeeper. The system may include user devices in the network in electronic communication with the data ingestion engine. The system may include a data structure map in electronic communication with the data ingestion engine.

The system may include a data mesh. The system may include a data ingestion engine operating in the data mesh. The system may include data storage units located in the data mesh in electronic communication with the data ingestion engine. The system may include controllers located in the data mesh in electronic communication with the data ingestion engine and the data storage units. The system may include user devices in the data mesh in electronic communication with the data ingestion engine.

A device may be a computer processor. A device may be a computer. A device may be an edge computing device. A device may be a personal computer. A device may utilize any of these examples of a device.

The data ingestion engine may be configured to implement machine learning systems. In the following description of the system, the data ingestion engine may include a computer processor running it. In the following description of the system, the data ingestion engine may include a machine learning system operating on it.

A computer processor may implement multiple AI/ML systems on the data ingestion engine. A computer processor may use an AI/ML system to create a usage structure model for the system's users.

A computer processor may implement an AI/ML system that involves, for example, a user who desires to access data at a certain level of structure. For example, the user may require the structured data to power a data structure model. In such a case, or another similar case, the AI/ML system may replace the unstructured data in a way that provides the information in a structured way to power the data structure model without revealing unstructured data. Alternatively, the AI/ML system may aggregate the unstructured data in a way that provides structured data to power the data structure model without revealing unstructured data.

A computer processor may implement an AI/ML system that involves segmenting the structured data stored in the system. By reducing data storage redundancy and having a structured data storage scheme, efficiency of the system is enhanced.

A computer processor may implement an AI/ML system to mine data found in data storage across a data mesh. The AI/ML system could determine where data is stored throughout the data mesh, allowing for rapid retrieval.

A further aspect to the AI/ML system involving structuring data storage may include tokenizing and/or encrypting the data. For example, the data ingestion engine may control access to the data by creating a token or key in the metadata of the data. Access to the data may necessitate possession of the token or key. Alternatively, or complementary, a controller may require a pre-authorization token or pre-authorization key to proceed with requesting access to the data storage unit. The pre-authorization token or key provides another level of protection to the data in the data storage unit. Access may be granted to a user device, for example, only when presenting a valid pre-authorization token or key. However, when no valid user device is presenting a pre-authorization key, the connection to the data storage unit may be shut down. When data is requested, the data storage unit may be woken up for use, but the data storage unit may be maintained in a dormant state. Furthermore, the pre-authorization token or key, together with the token or key in the metadata of the data, may complement each other in creating an even higher level of security to the data. In addition, requiring a separate token or key from a user and the user's device may add one or more additional levels are security.

Returning to the description of the apparatus, the apparatus may include a system for structuring data stored in data storage units across a network and/or in a data mesh. The system may include a network and/or a data mesh. The system may include a data ingestion engine operating in the network and/or data mesh. The system may include data storage units located in the data mesh in electronic communication with the data ingestion engine. The system may include controllers located in the network and/or data mesh in electronic communication with the data ingestion engine and the data storage units. The system may include user devices in the network and/or data mesh in electronic communication with the data ingestion engine. The system may include a network and/or data structure map in electronic communication with the data ingestion engine.

The apparatus may include the data ingestion engine configured to implement one or more machine learning systems. The data ingestion engine may be configured to receive a user token or key from a user of a user device. The data ingestion engine may be configured to receive a device token or key from a user device. The combination of requiring receipt of the user token or key and the device token or key may add to the security of the data in the data storage units. The data ingestion engine may be configured to look up in the data structure map the level of access to data which the user device is entitled based on the user token or key and a device token or key presented. The data ingestion engine may be configured to provide the user token or key and the device token or key to one or more controllers positioned between the data ingestion engine and the one or more data storage units.

The system may include the controller communicating with the one or more data storage units to wake them up from a dormant state. The system may include the data ingestion engine configured to receive clearance from the one or more controllers to access the one or more data storage units. The system may include the data ingestion engine configured to provide the user token or key and device token or key to one or more data storage units. The system may include the data ingestion engine configured to retrieve the data according to the level of structure requested or found in the data structure map and according to data whose tokens or key in their metadata correlate to the user token or key, the device token or key, or both the user token or key and the device token or key. The system may include the data ingestion engine configured to provide the retrieved data to the user device. The system may include the data ingestion engine configured to revert the data in the data storage unit back to the dormant state.

The system may include a machine learning model to optimize the data ingestion engine's communication with a data storage unit. The data ingestion engine may provide the user token or key and the device token or key to a controller positioned between the data ingestion engine and a data storage unit. After receiving the user token or key and the device token or key, the controller may communicate with the data storage unit to wake it up from a dormant state. The data ingestion engine may receive clearance from the controller to access the data storage unit. The data ingestion engine may then communicate directly with the data storage unit. The data ingestion engine may communicate with the data storage unit through the controller. The data ingestion engine may provide the user token or key and the device token or key directly to the data storage unit. The data ingestion engine may then retrieve data according to the level of access granted. The level of data structure may be a function of data structure rules or other structured data in the data structure map. The level of data structure may be a function of which data is accessible with the user token or key and the device token or key, or both the user and device tokens or keys. The data ingestion engine may provide the retrieved structured data to the user device.

The system may include the data ingestion engine communicating with the data storage units located in the data mesh to implement a machine learning system to categorize and layer data within the data storage unit according to the structure level of the data. The system may include the machine learning system tokenizing or encrypting the data in the data storage units by creating a token or key in the metadata of the data that corresponds to the structure of the data. The system may include the data ingestion engine receiving a user token or key from a user of a user device, a device token or key from a device of the user device, or both a user and device token or key.

The system may include a machine learning system to optimize the data ingestion engine's structuring with a data structure map. The data structure map may contain information about the user device's authorization to access varying levels of data structure based on the user token or key and the device token or key presented by the user device.

The system may include determining the need of a user device for continued access to the data structure. In such a circumstance, the user device may send continual or periodic signals to the data ingestion engine. A signal may be a periodic signal generated by the user device and provided to the data ingestion engine to indicate an ongoing desire to receive the data. When receiving such a signal, the data ingestion engine may maintain the flow of data from the data storage units to the user device. When ceasing to receive the signal, the data ingestion engine may provide instructions to the data storage units to close the user device's access to the data. The data ingestion engine may additionally instruct the data storage units to revert to a dormant state. The dormant state may make it difficult for an unapproved party to access the data in the data storage units.

The system may include the default setting for the data in the data storage units to be in a dormant state. The system may include two lines of communication between the data ingestion engine and the data storage units. One line may be a direct line of communication which may be in a default dormant state. Another line may be a line to a controller which itself has a line of communication with a data storage unit. This line may be in a default open state. When the controller receives a pre-authorization from the data ingestion engine, which may be one or more tokens or keys from the user device, the controller may communicate with the data storage unit, for example, by way of a backchannel, to activate out of the dormant state the direct line of communication with the data ingestion engine. When the pre-authorization line from the data ingestion engine goes silent, the direct communication line between the data ingestion engine and the data storage units may also go silent, for example, revert to the dormant state.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Apparatus and methods for structured data processing is provided. The system may include a data exchange. The data exchange may be resident on an Oracle Exadata box. The data exchange may include a data mesh. The data mesh may include an unstructured data layer, a transport layer, and a structured data layer.

In some embodiments, a data mesh may structure unstructured data. While the data remains unstructured, the data mesh provides some structure to the data making it easier to access and organize in the future.

In some embodiments, the data mesh may incorporate optical character recognition (OCR) to make the data text searchable. A data mesh may be provided on top of the OCR processing and integration.

In some embodiments, a data reorganization engine (DRE) may be used to analyze data. The data is not changed or altered, but rather analyzed and interpreted with respect to structure. A data map, storage map, or data structure map is generated to store, access, analyze, and interpret the data and its structure.

In some embodiments, existing data within the data mesh may be used as training data to feed the AI/ML apparatus. This creates a feedback loop as an intelligent learning mechanism for the data mesh.

In some embodiments, the apparatus and methods may include one or more raw data sources. The data sources may incorporate structured data, semi-structured data, and/or unstructured data.

In some embodiments, a database management system may be configured to store data with data structure. Data structure may vary depending on organization of data fragments. Data fragments may be encrypted or encoded for data points such as name, address, telephone number, account value, account password, and account past transactions.

In some embodiments, the data exchange may receive a plurality of records at the unstructured data layer. The plurality of records may be included in a plurality of nodes from a plurality of SORs.

In some embodiments, the data exchange may process the plurality of nodes. The process may use a data structure model to structure the received plurality of records included in the plurality of nodes. The use of the data model to structure the received plurality of records may include removing duplicate records from the plurality of records, reordering the records, or moving the records. The use of the data model to structure the received plurality of records may include removing duplicate records from the plurality of records, reordering the records, or moving the records. The use of the data model to structure the received plurality of records may include reformat of one or more records included in the plurality of records from ASCII format to a format consumable by the data exchange.

In some embodiments, the data structure model may include an arrangement of the plurality of nodes in a plurality of predetermined sequences. Each of the predetermined sequences may include a list of one or more nodes. Each of the predetermined sequences may include a root node.

The plurality of predetermined sequences may be structured in parallel such that the processing of the root nodes within each sequence is initiated concurrently. Processing the next node within each sequence may be initiated upon completion of processing of a prior node within each sequence. The process may transmit the structured plurality of records to the structured data layer.

Provided herein is an apparatus for multi-leveled structure-based data storage in a multi-siloed database.

In some embodiments, the apparatus involves a network of a plurality of nodes, the plurality of nodes including a first node and a second node.

In some embodiments, the apparatus involves a data mesh having a plurality of data silos. Each of the data silos is associated with one of the plurality of nodes. Each data silo is in electronic communication with the remaining data silos included in the plurality of data silos and is assigned a predetermined level of structure that corresponds to one predetermined level of structure included in a plurality of predetermined levels of structure.

In some embodiments, the apparatus involves a data ingestion engine running an artificial intelligence module operable to receive an unstructured dataset, the unstructured dataset comprising unstructured data, from the first node, and, in response to receipt of the unstructured dataset, analyze the unstructured data included in the unstructured dataset.

In some embodiments, the apparatus splits the unstructured data included in the unstructured dataset into a plurality of data fragments, assigns a level of structure to each data fragment that corresponds to one predetermined level of structure included in the plurality of predetermined levels of structure, aggregates the data fragments to form a plurality of structured data segments based on the assigned level of structure, where each structured data segment corresponds to a level of structure, included in the plurality of levels of structure, transmits each structured data segment that is assigned a level of structure to a data silo that corresponds to the structure assigned to the structured data segment, stores each structured data segment that is assigned a level of structure in the data silo that corresponds to the level of structure assigned to the structured data segment, and creates a data structure map. The data structure map is made up of at least one structured data segment and a data silo in which the structured data segment is stored.

In some embodiments, the apparatus and method use a plurality of structured data segments that are structured, at least in part, based on optical character recognition (OCR).

In some embodiments, the apparatus and method use a plurality of structured data segments that are structured, at least in part, based on numerical values.

In some embodiments, the apparatus and method use a plurality of structured data segments that are structured, at least in part, based on cryptographic tokenization.

In some embodiments, the apparatus and method use a plurality of structured data segments that are structured, at least in part, based on data elements.

In some embodiments, the data elements include, but are not limited to, account number, telephone number, and account balance.

In some embodiments, the apparatus implements a data request at the data ingestion engine from a second node, the second node included in the network, the data request requesting an unstructured dataset.

In some embodiments, the apparatus receives the data request, retrieves, using the data structure map to locate the plurality of structured data segments of the unstructured dataset, the plurality of structured data segments from each of the data silos, and determines whether one or more of the structured data segments have an assigned level of structure less than an assigned level of structure of the second node.

In some embodiments, the apparatus excludes the one or more structured data segments, combines the remaining structured data segments to recreate the dataset, and transmits the recreated structured dataset to the second node.

Also provided herein are methods for multi-leveled structure-based data storing in a multi-siloed database.

In some embodiments, the method involves transmitting an unstructured dataset from a first node to a data mesh, the first node included in a network, the network comprised of a plurality of nodes; receiving the unstructured dataset at a data ingestion engine, the data ingestion engine running an artificial intelligence module, the unstructured dataset including unstructured data; in response to receiving the unstructured dataset, analyzing the unstructured data included in the unstructured dataset; splitting the unstructured data included in the unstructured dataset into a plurality of data fragments; assigning a level of structure to each data fragment that corresponds to one predetermined level of structure included in a plurality of predetermined levels of structure; aggregating the data fragments to form a plurality of structured data segments based on the assigned level of structure, where each structured data segment corresponds to a level of structure included in the plurality of predetermined levels of structure; transmitting each structured data segment that is assigned a level of structure to a data silo that corresponds to the level of structure assigned to the data segment, the data silo included in the data mesh, the data mesh comprising a plurality of data silos, each of the data silos being associated with at least one of the plurality of nodes, each data silo being in electronic communication with the remaining data silos included in the plurality of data silos, each data silo is assigned a predetermined level of structure that corresponds to one predetermined level of structure included in the plurality of predetermined levels of structure; storing each structured data segment that is assigned a level of structure in the data silo that corresponds to the level of structure assigned to the data segment; and creating a data structure map. The data structure map is made of at least one structured data segment and the data silo in which the data segment is stored.

In some embodiments, the method involves receiving a data request at the data ingestion engine from a second node, the second node included in the network, the data request requesting the unstructured dataset; in response to the receiving the data request, retrieving, using the data structure map to locate the plurality of structured data segments of the unstructured dataset, the plurality of structured data segments from each of the data silos; determining that one or more of the structured data segments have an assigned level of structure that is less than an assigned level of structure of the second node; excluding the one or more structured data segments; combining the remaining structured data segments to recreate the dataset; and transmitting the recreated dataset to the second node.

In some embodiments, the data structure level increases from 1 to 5. A data structure score of 1 corresponds to the lowest level of structure and a data structure score of 5 corresponds to the highest level of structure.

In some embodiments, the data structure level decreases from 1 to 5. A data structure score of 1 corresponds to the highest level of structure and a data structure score of 5 corresponds to the lowest level of structure.

Data structure scores could vary in number and 1-5 are only exemplary numbers and ranges. For example, data structure scores could range from 1-10, 1-20, 1-50, and 1-100.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface (API). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program(s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
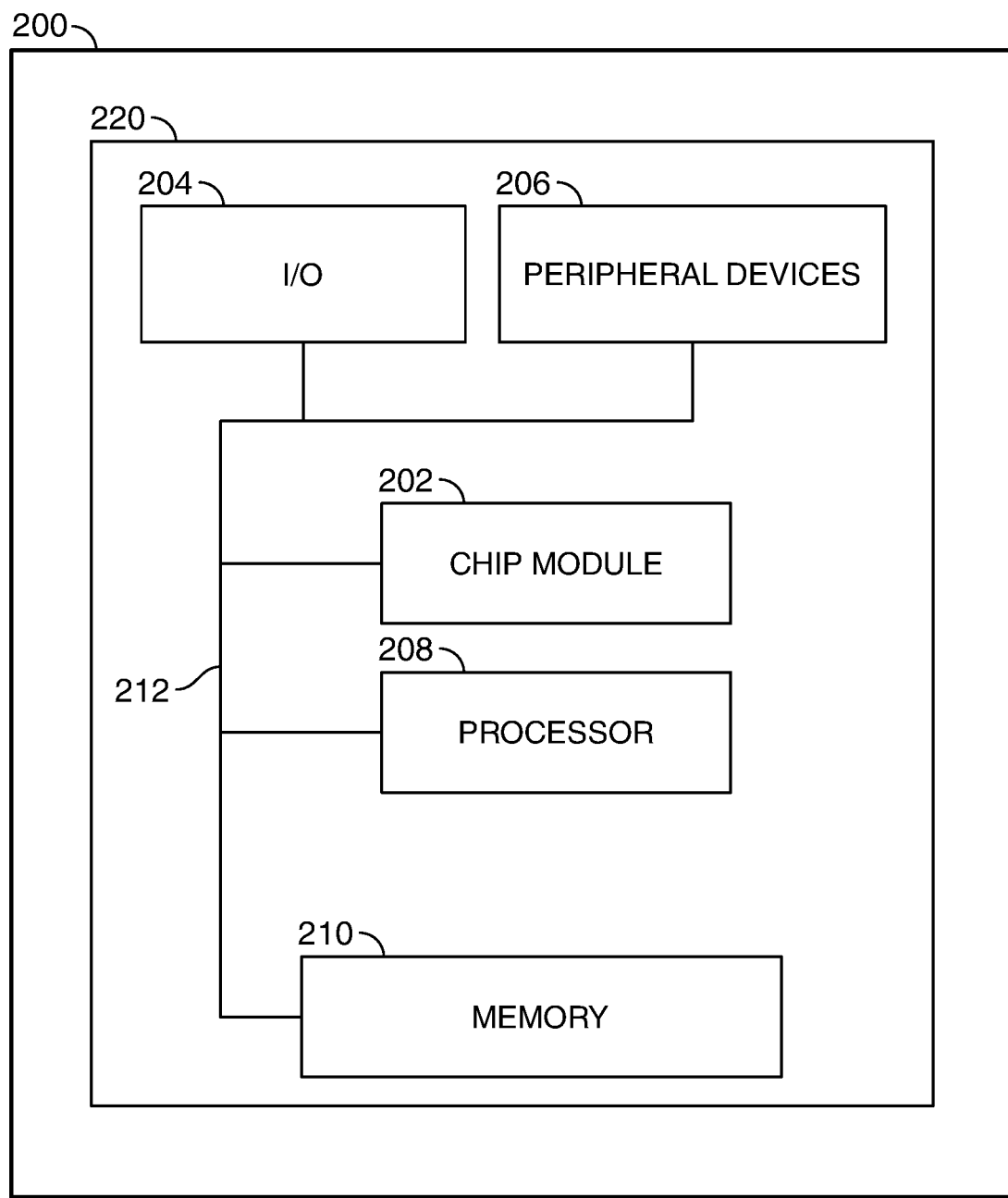
FIG. 2 shows another illustrative block diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
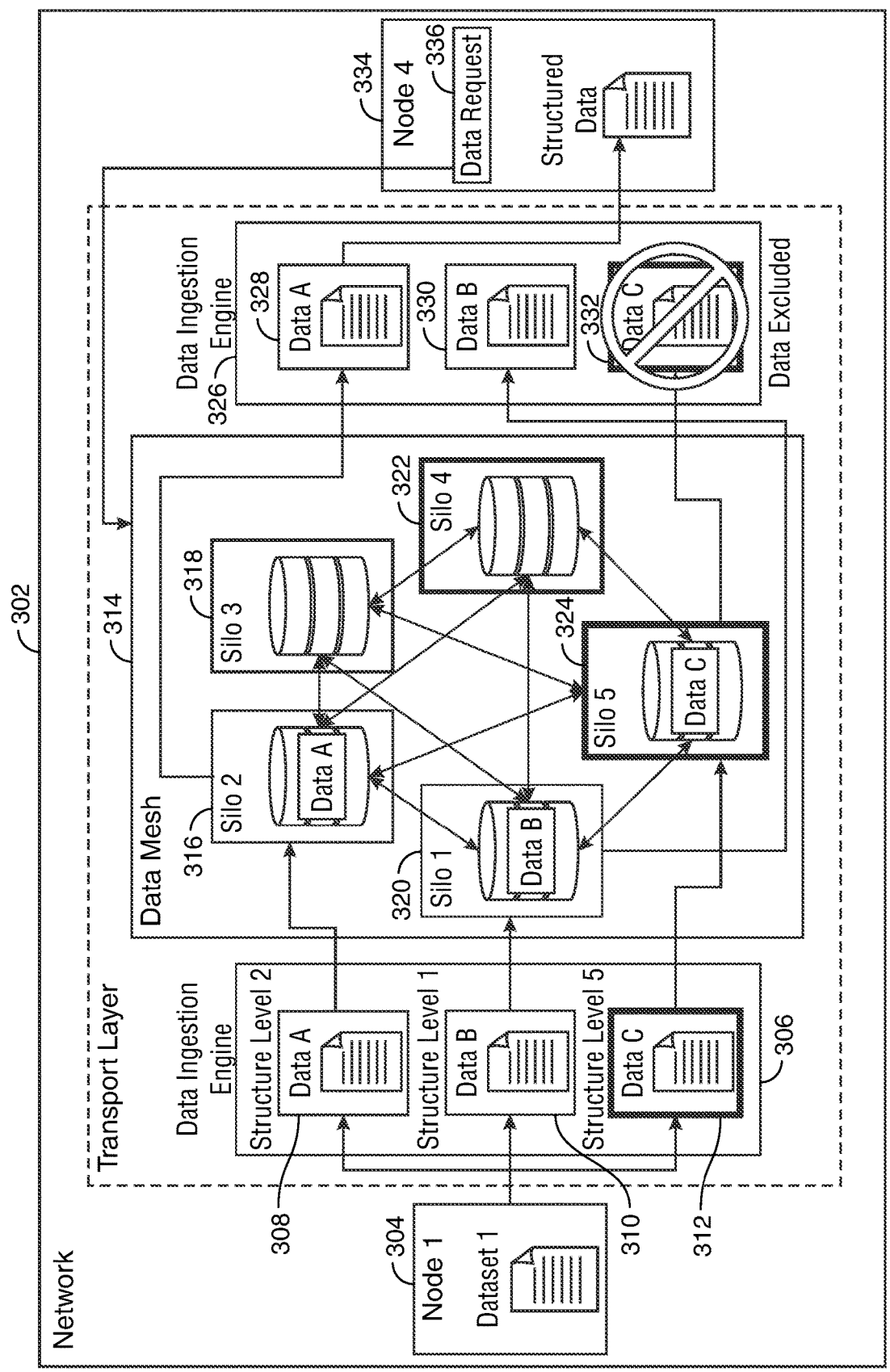
FIG. 3 shows an illustrative flow diagram in accordance with principles of the disclosure.

FIG. 3 shows an illustrative flow diagram 302. A data mesh 314 is shown. Node 1 304 containing dataset 1, data ingestion engine 306, and node 4 334 may have two-way communication with data ingestion engine 326. The data mesh may request data, transmit data to be stored, and/or transmit signals to data ingestion engines 306 and 326. The data ingestion engines 306 and 326 may provide data to a user device or nodes, receive a data request from a user device or nodes, and/or receive signals from a user device or nodes. Node 4 334 can process a data request 336 and produce structured data.

Data ingestion engine 306 may communicate with data A 308, data B 310, and data C 312. Data mesh 314 seek to structure data by eliminating unstructured data (structure level 5) through silo 1 320 (data B), silo 2 316 (data A), silo 3 318, silo 4 322, and silo 5 324 (data C), respectively, as indicated by the thick solid line. Data ingestion engine 326 may present a pre-authorization key to one of the controllers to seek access to the respective data storage unit. If authorization is granted, the controller may open a backchannel to the respective data storage unit, as indicated by the thin solid line, to activate the data storage unit out of its state of dormancy. Data ingestion engine 326 may then communicate directly with the activated data storage unit, as indicated by the thick dashed line. The thick dashed line may indicate that the data is excluded from the structured data. Data ingestion engine 326 may provide data to the data storage units to store the data in the latter. Data ingestion engine 326 may request and receive data from the data storage units for data A 328, data B 330, and data C 332 (data excluded).

Figure 4:
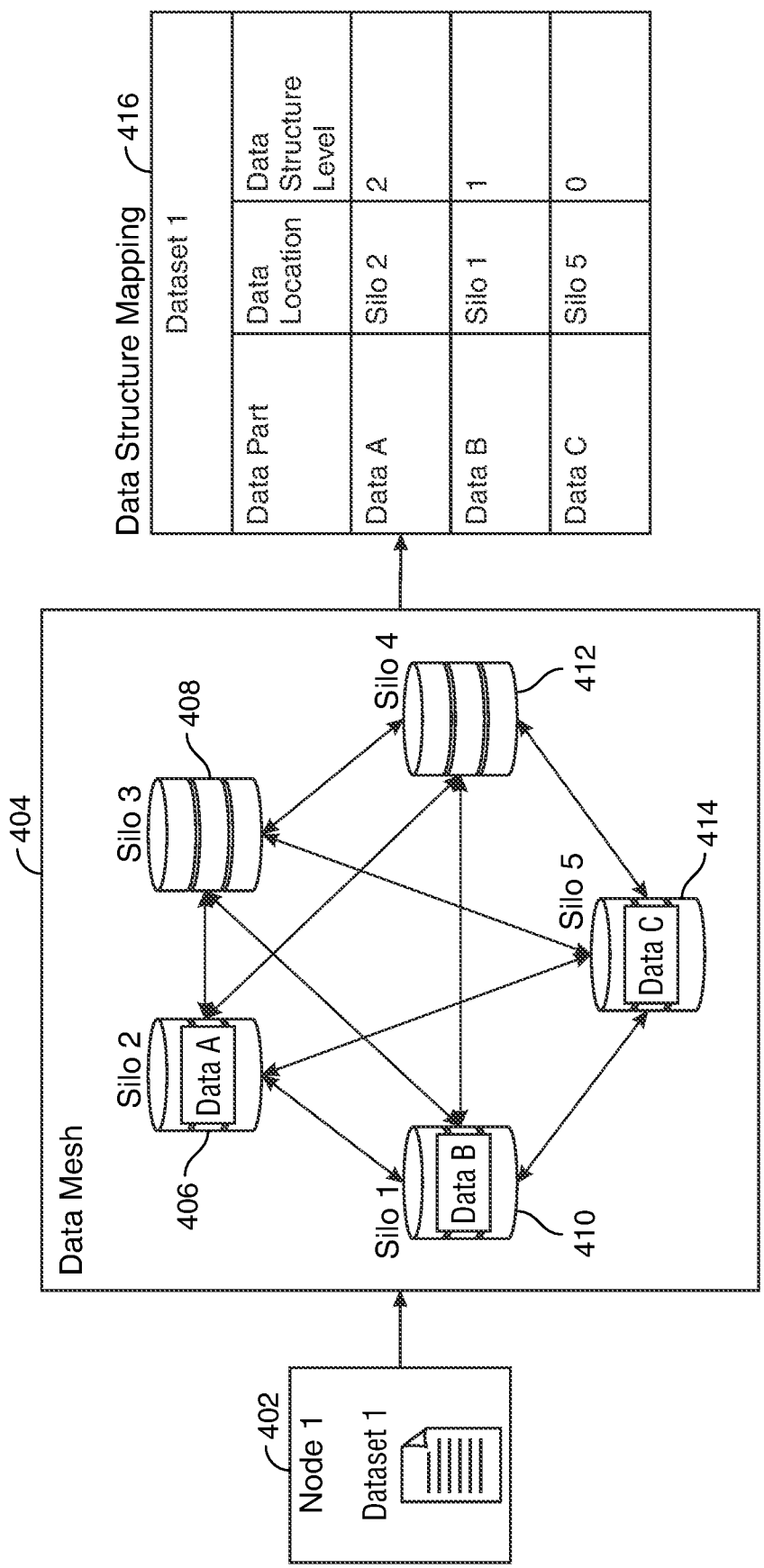
FIG. 4 shows another illustrative flow diagram in accordance with principles of the disclosure.

FIG. 4 shows an illustrative diagram. The diagram may represent a data structure map 416. The data structure map may provide a correlation between a node 1 402 (dataset 1) and a data mesh 404. For example, node 1 402 (dataset 1) may be analyzed by the data mesh 404 by looking at various data silos, silo 1 410 (data B), silo 2 406 (data A), silo 3 408, silo 4 412, and silo 5 414 (data C). The data structure map 416 then provides the data structure level and data location (silo number) for each of data A, B, and C.

Figure 5:
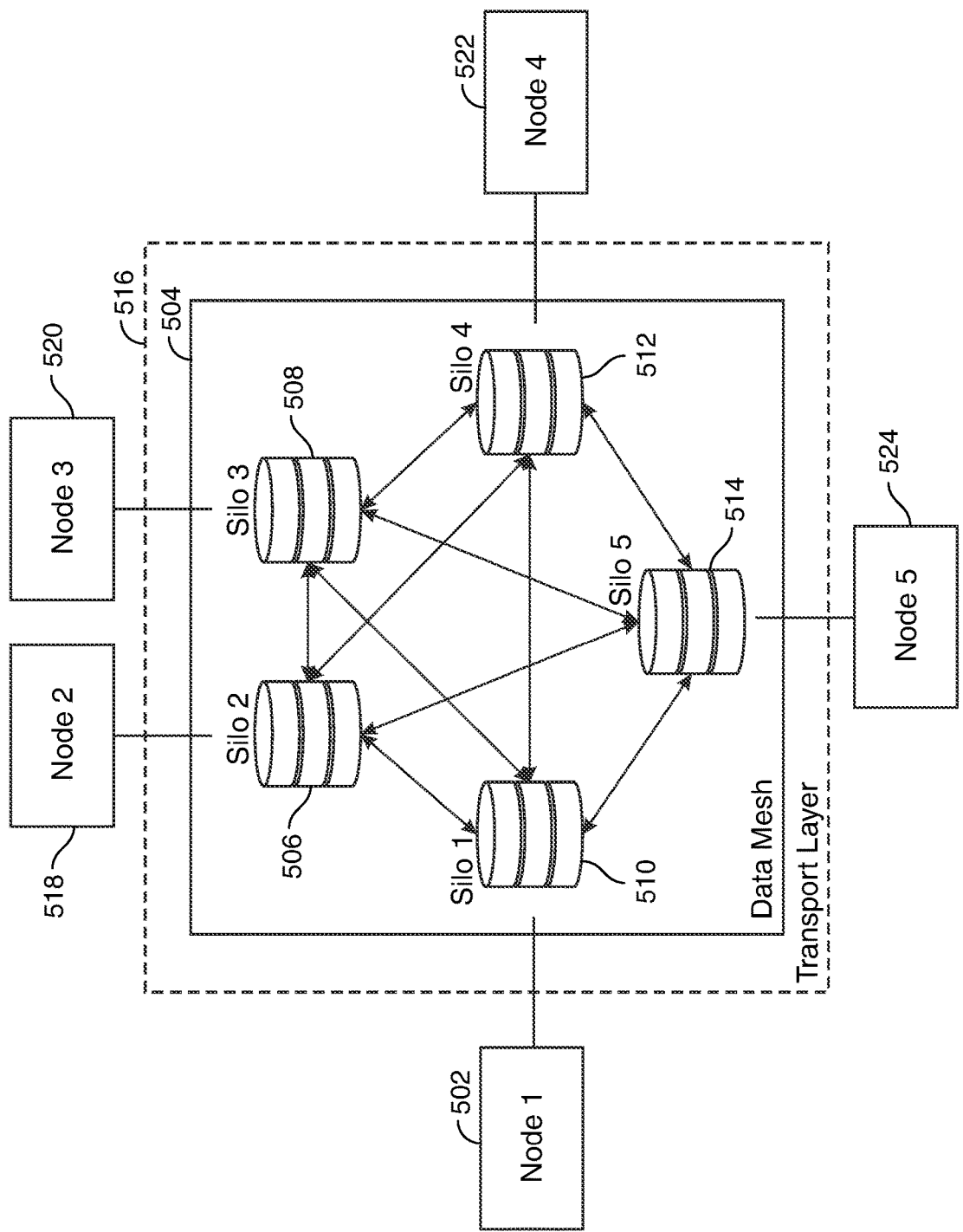
FIG. 5 shows yet another illustrative flow diagram in accordance with principles of the disclosure.

FIG. 5 shows an illustrative diagram. The diagram may represent a series of data storage units such as the data storage nodes found in FIG. 4. Data storage node 1 502 may contain, for example, five levels of data storage, silo 1 510, silo 2 506, silo 3 508, silo 4 512, and silo 5 514, corresponding to five nodes, node 1 502, node 2 518, node 3 520, node 4 522, and node 5 524. The five silos and/or nodes may correspond to distinct levels of data structure. Therefore, a user device may access some levels of data structure, but not all levels of data structure. Further, a transport layer 616 enables transport of data freely between silos. Five levels of data structure may be exemplary, but any number of levels of structure may be possible.

Figure 6:
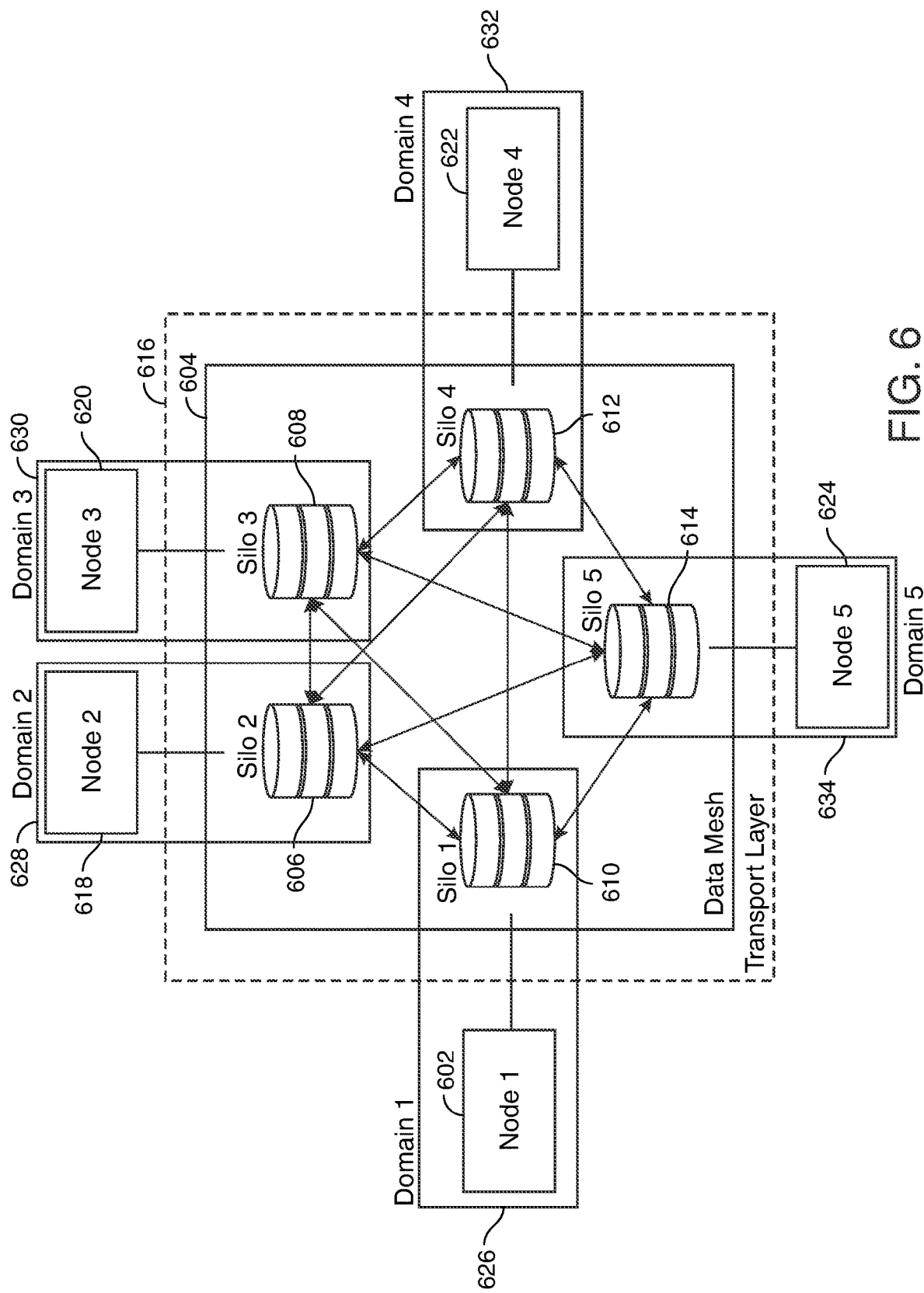
FIG. 6 shows still another illustrative flow diagram in accordance with principles of the disclosure.

FIG. 6 shows an illustrative flowchart. The flowchart tracks FIG. 5. The flowchart shows how node 1 602 and silo 1 610 are connected in domain 1 626. Domain 2 628, domain 3 630, domain 4 632, and domain 5 634 indicate how the other nodes and silos connect.

Figure 7:
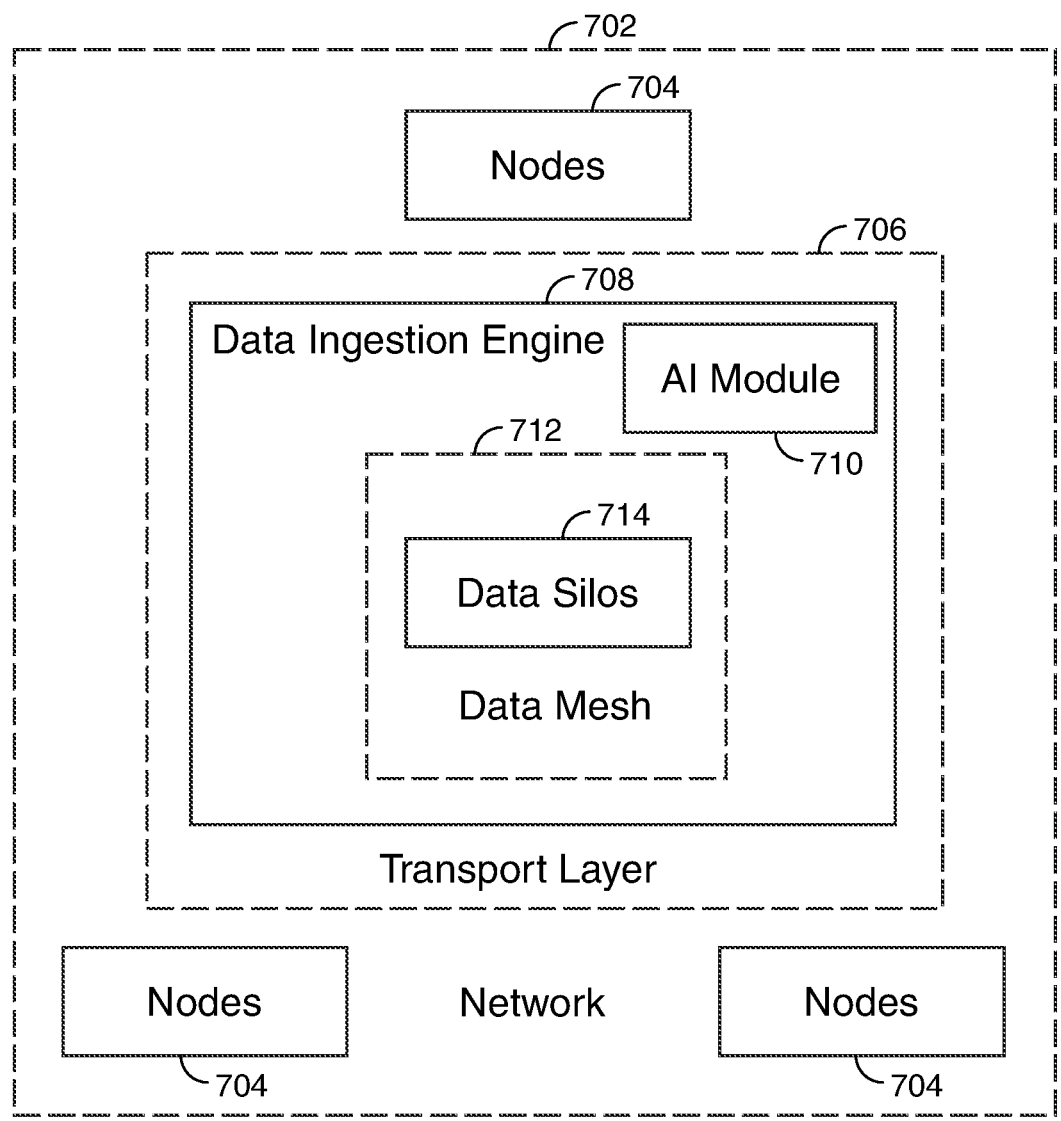
FIG. 7 shows an illustrative diagram in accordance with principles of the disclosure.

FIG. 7 shows an illustrative block diagram 702. The block diagram indicates the entire data mesh system with nodes 704, a data ingestion engine 708, a transport layer 706, an AI module 710, a data mesh 712, and data silos 714.

Figure 8:
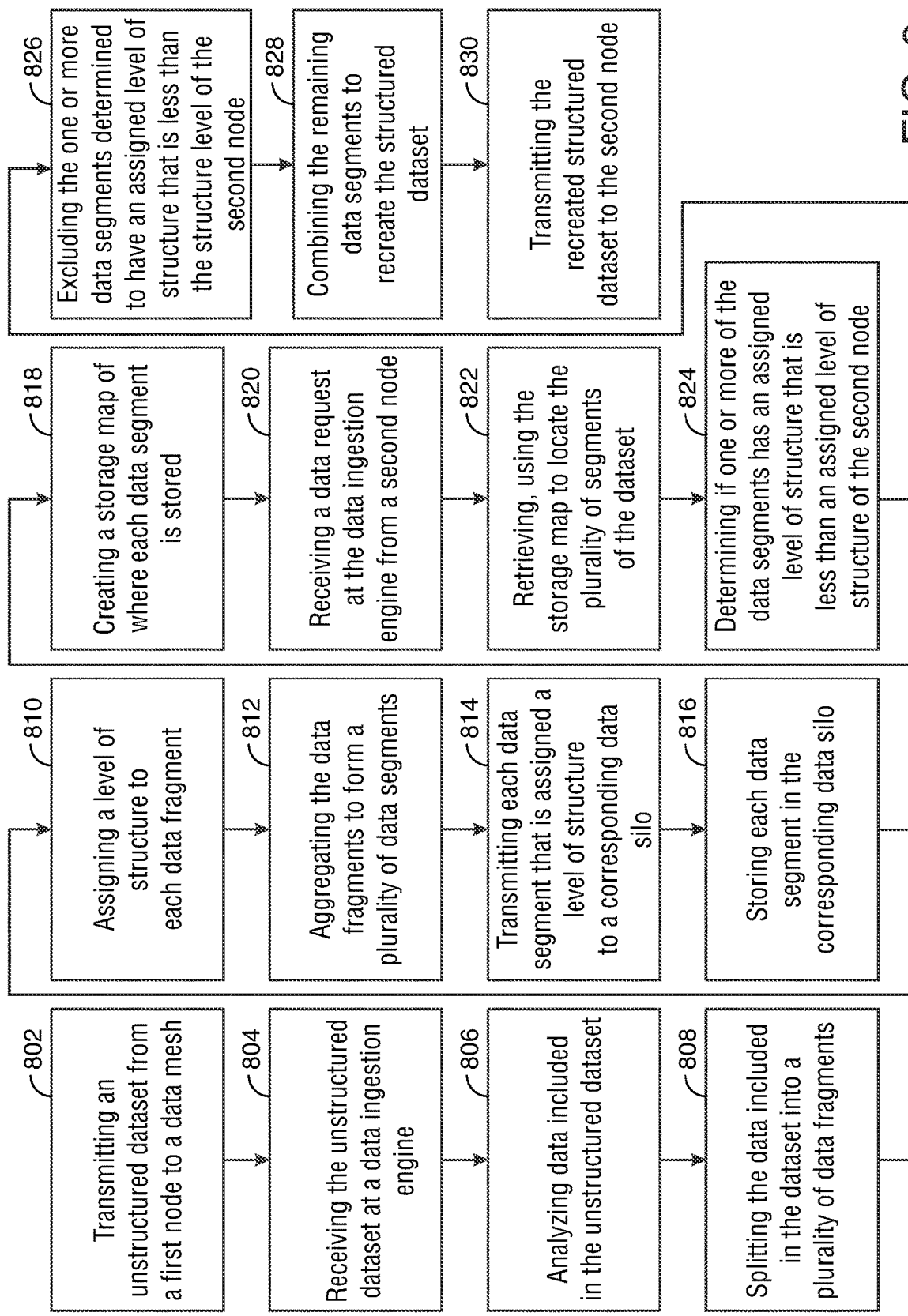
FIG. 8 shows yet another block diagram in accordance with principles of the disclosure.

FIG. 8 shows a block diagram flowchart. The steps in the flowchart may be performed in any order and the following set of steps is non-limiting. The flowchart starts at 802, the first step of the apparatus, transmitting an unstructured dataset from a first node to a data mesh.

The next step of the apparatus, step 804, involves transmitting and receiving the unstructured dataset at a data ingestion engine.

Following that step, the apparatus 806 analyzes data included in an unstructured dataset. The unstructured dataset may include address, telephone number, account number, account balance, and other financial and personal information.

Moving on, the apparatus step 808 involves splitting the data included in the dataset into a plurality of data fragments.

Then the apparatus step 810 involves assigning a level of structure to each data fragment. Each level of structure assigned may correspond to a predefined level of structure. The levels of structure may be determined by previously defined levels of structure.

Further, the apparatus step 812 involves aggregating the data fragments to form a plurality of data segments.

The next step of the apparatus, step 814, involves transmitting each data segment that is assigned a level of structure to a corresponding data silo.

The following step of the apparatus, step 816, involves storing each data segment in the corresponding data silo.

Apparatus step 818 is a step involving the creation of a storage map or data structure map. The storage map contains information about each data segment. For example, the storage map may contain data segment title, location, and structure level.

The next step of the apparatus, step 820, involves receiving a data request at the data ingestion engine from a second node.

Following that step, apparatus step 822 involves retrieving and using the storage map to locate the plurality of data segments of the dataset.

Then the apparatus step 824 involves determining if one or more of the data segments has an assigned level of structure that is less than an assigned level of structure of the second node.

After that step, the apparatus step 826 involves excluding the one or more data segments determined to have an assigned level of structure that is higher than the structure level of the second node.

At this point, apparatus step 828 involves combining the remaining data segments to recreate the structured dataset.

At the final step, step 830, the data ingestion engine may stop the method as the method may be completed. This occurs when the data is transmitted as a recreated structured dataset to a second node.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a data mesh for unstructured data are provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for multi-leveled structure-based data storage in a multi-siloed database, the apparatus comprising:
    a network comprising a plurality of nodes, the plurality of nodes including a first node and a second node;
    a data mesh comprising a plurality of data silos, each of the data silos being associated with at least one of the plurality of nodes, each data silo being in electronic communication with the remaining data silos included in the plurality of data silos, each data silo is assigned a predetermined level of structure that corresponds to one predetermined level of structure included in a plurality of predetermined levels of structure;
    a transport layer that enables transport of data freely between the plurality of data silos; and
    a data ingestion engine running an artificial intelligence module operable to:
        receive an unstructured dataset, the unstructured dataset comprising unstructured data, from the first node;
        in response to receipt of the unstructured dataset, analyze the unstructured data included in the unstructured dataset;
        split the unstructured data included in the unstructured dataset into a plurality of data fragments;
        assign a level of structure to each data fragment that corresponds to one predetermined level of structure included in the plurality of predetermined levels of structure;
        aggregate the data fragments to form a plurality of structured data segments based on the assigned level of structure, where each structured data segment corresponds to a level of structure, included in the plurality of predetermined levels of structure;
        transmit each structured data segment that is assigned a level of structure to a data silo that corresponds to the structure assigned to the structured data segment;
        store each structured data segment that is assigned a level of structure in the data silo that corresponds to the level of structure assigned to the structured data segment;
        present pre-authorization keys to access the plurality of data silos by a plurality of backchannels;
        provide data to the plurality of data silos by the plurality of backchannels;
        request and receive data from the plurality of data silos by the plurality of backchannels; and create a data structure map, said data structure map comprising:
  each structured data segment; and
  the data silo in which the structured data segment is stored.

2. The apparatus of claim 1, further comprising:
a data request at the data ingestion engine from a second node, the second node included in the network, the data request requesting an unstructured dataset;
in response to receiving the data request, retrieving, using a data structure map to locate a plurality of structured data segments of the unstructured dataset, the plurality of structured data segments from each of the data silos;
determining whether one or more of the structured data segments have an assigned level of structure that is less than an assigned level of structure of the second node;
excluding the one or more structured data segments assigned a level of structure that is less than an assigned level of structure of the second node;
combining the remaining structured data segments to recreate the dataset; and
transmitting the recreated dataset to the second node.

3. The apparatus of claim 1, further comprising:
a data ingestion engine implementing an artificial intelligence module operable to structure data based on at least one previous structuring of data, using the at least one previous structuring of data as training data in a feedback loop of artificial intelligence learning and structuring applied to future data structuring.

4. The apparatus of claim 1, wherein the plurality of structured data segments is structured, at least in part, based on optical character recognition (OCR).

5. The apparatus of claim 1, wherein the plurality of structured data segments is structured, at least in part, based on numerical values.

6. The apparatus of claim 1, wherein the plurality of structured data segments is structured, at least in part, based on cryptographic tokenization.

7. The apparatus of claim 1, wherein the plurality of structured data segments is structured, at least in part, based on data elements.

8. The apparatus of claim 7, wherein the data elements comprise account number, telephone number, and account balance.

9. A method for multi-leveled structure-based data storing in a multi-siloed database, the method comprising:
transmitting an unstructured dataset from a first node to a data mesh, the first node included in a network, the network comprised of a plurality of nodes;
receiving the unstructured dataset at a data ingestion engine, the data ingestion engine running an artificial intelligence module, the unstructured dataset including unstructured data;
in response to receiving the unstructured dataset, analyzing the unstructured data included in the unstructured dataset;
splitting the unstructured data included in the unstructured dataset into a plurality of data fragments;
assigning a level of structure to each data fragment that corresponds to one predetermined level of structure included in a plurality of predetermined levels of structure;
aggregating the data fragments to form a plurality of structured data segments based on the assigned level of structure, where each structured data segment corresponds to a level of structure included in the plurality of predetermined levels of structure;
transmitting each structured data segment that is assigned a level of structure to a data silo that corresponds to the level of structure assigned to the data segment, the data silo included in the data mesh, the data mesh comprising a plurality of data silos, each of the data silos being associated with at least one of the plurality of nodes, each data silo being in electronic communication with the remaining data silos included in the plurality of data silos, each data silo is assigned a predetermined level of structure that corresponds to one predetermined level of structure included in the plurality of predetermined levels of structure;
transporting data freely between the plurality of data silos via a transport layer;
storing each structured data segment that is assigned a level of structure in the data silo that corresponds to the level of structure assigned to the data segment;
presenting pre-authorization keys to access the plurality of data silos by a plurality of backchannels;
providing data to the plurality of data silos by the plurality of backchannels;
requesting and receive data from the plurality of data silos by the plurality of backchannels; and
creating a data structure map, said data structure map comprising:
  each structured data segment;
  the data silo in which the data segment is stored.

10. The method of claim 9 further including:
receiving a data request at the data ingestion engine from a second node, the second node included in the network, the data request requesting the unstructured dataset;
in response to the receiving the data request, retrieving, using the data structure map to locate the plurality of structured data segments of the unstructured dataset, the plurality of structured data segments from each of the data silos;
determining whether one or more of the structured data segments have an assigned level of structure that is less than an assigned level of structure of the second node;
excluding the one or more structured data segments with an assigned level of structure that is less than an assigned level of structure of the second node;
combining the remaining structured data segments to recreate the dataset; and
transmitting the recreated dataset to the second node.

11. The method of claim 9 further including:
a data ingestion engine implementing an artificial intelligence module operable to structure data based on at least one previous structuring of data, using the at least one previous structuring of data as training data in a feedback loop of artificial intelligence learning and structuring applied to future data structuring.

12. The method of claim 9, wherein the plurality of structured data segments is structured, at least in part, based on optical character recognition (OCR).

13. The method of claim 9, wherein the plurality of structured data segments is structured, at least in part, based on numerical values.

14. The method of claim 9, wherein the plurality of structured data segments is structured, at least in part, based on cryptographic tokenization.

15. The method of claim 14, wherein the data elements comprise account number, telephone number, and account balance.

16. The method of claim 9, wherein the plurality of structured data segments is structured, at least in part, based on data elements.

\* \* \* \* \*